United States Patent
Allison

(10) Patent No.: US 12,429,091 B2
(45) Date of Patent: Sep. 30, 2025

(54) SEPARATOR FOR ROLLING ELEMENT BEARINGS

(71) Applicant: AKTIEBOLAGET SKF, Gothenburg (SE)

(72) Inventor: Bryan D. Allison, Clymer, NY (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 18/457,473

(22) Filed: Aug. 29, 2023

(65) Prior Publication Data

US 2025/0075738 A1   Mar. 6, 2025

(51) Int. Cl.
| | |
|---|---|
| F16C 19/06 | (2006.01) |
| F16C 33/37 | (2006.01) |
| F16C 33/66 | (2006.01) |

(52) U.S. Cl.
CPC .............. *F16C 33/37* (2013.01); *F16C 19/06* (2013.01); *F16C 33/6614* (2013.01); *F16C 33/6696* (2013.01); *F16C 2208/02* (2013.01)

(58) Field of Classification Search
CPC .......... F16C 19/06; F16C 19/26; F16C 33/32; F16C 33/34; F16C 33/37; F16C 33/3706; F16C 33/3818; F16C 33/6696; F16C 2208/02; F16C 33/6614; F16C 2202/02
See application file for complete search history.

(56) References Cited

U.S. PATENT DOCUMENTS 1,143,590 A * 6/1915 Shimer ................ F16C 33/605
384/564

2013/0182987 A1   7/2013 Himeno et al.
2016/0238076 A1 * 8/2016 Aiga ..................... C10M 125/22

FOREIGN PATENT DOCUMENTS

| DE | 102018202849 A1 * | 8/2019 | |
|---|---|---|---|
| FR | 362421 A * | 6/1906 | |
| JP | S4941230 B1 * | 11/1974 | |
| JP | H0128248 B2 * | 6/1989 | |
| JP | H08184318 A | 7/1996 | |
| JP | 2007092983 A * | 4/2007 | ........ F16C 33/3706 |

(Continued)

OTHER PUBLICATIONS

Office Action from the United States Patent Office mailed Feb. 26, 2025 in related U.S. Appl. No. 18/457,477.

Primary Examiner — Phillip A Johnson
(74) Attorney, Agent, or Firm — J-TEK LAW PLLC; Scott T. Wakeman; Mark A. Ussai

(57) ABSTRACT

A separator for rolling elements of a bearing includes a body formed of a composite material and having a central pocket sized to receive one of a plurality of rolling elements, a first contact end to contact one adjacent rolling element and an opposing, second contact end to contact another adjacent rolling element. The composite material includes a mixture of a polymer base, reinforcing fibers and a lubricant, preferably, polyetherimide, short strand carbon fibers and molybdenum disulfide. The separator body is sized such that a first distance between a pocket centerline and the first contact end establishes a desired spacing distance between the rolling element within the pocket and the one adjacent one rolling element and a second distance between the centerline and the second contact end establishes a desired spacing distance between the rolling element within the pocket and the other adjacent rolling element.

19 Claims, 7 Drawing Sheets

(56) References Cited

FOREIGN PATENT DOCUMENTS

JP            2008256086 A   *   10/2008   ............ F16C 19/163
WO         2011006856 A2      1/2011

* cited by examiner

SEPARATOR FOR ROLLING ELEMENT BEARINGS

BACKGROUND OF THE INVENTION

The present invention relates to bearings, and more particularly to separators for rolling element bearings.

Cages for rolling element bearings are well known and typically include an annular body with a plurality of circumferentially-spaced pockets, each pocket receiving a separate one of the rolling elements of the bearing. The cage establishes a desired spacing between adjacent rolling elements and guides the elements as the elements traverse a pitch circle defined between the bearing inner and outer rings. In certain applications, separators are used instead of cages and typically include a body with a single pocket that fits about an individual rolling element. Generally, a plurality of the separators are installed about half of the rolling elements in a set of rolling elements, with every other rolling element merely contacting two adjacent separators, such that the separators establish a desired spacing between the rolling elements.

In certain applications which require a substantially sterile environment, such as in semiconductor manufacturing or in the food processing industry, the bearing cages or the separators are often formed of a polymeric material, such as polyether ether ketone ("PEEK"). However, the cost of fabricating a cage or separator from PEEK and similar materials is relatively expensive and require substantial production volumes in order to be relatively affordable. Also, PEEK cages or separators may not be suitable for applications in which the bearing is subjected to relatively high temperatures.

SUMMARY OF THE INVENTION

In one aspect, the present invention is a separator for rolling elements of a bearing, the bearing including inner and outer rings and a plurality of the rolling elements disposed between the inner and outer rings. The separator comprises a body formed of a composite material and having a central pocket sized to receive one of the plurality of rolling elements, a first contact end configured to contact an adjacent one of the rolling elements and an opposing, second contact end configured to contact another adjacent one of the rolling elements. The composite material includes a mixture of a polymer base, reinforcing fibers and a lubricant.

In another aspect, the present invention is a method of forming a separator for a bearing having an inner ring, an outer ring and a plurality of rolling elements disposed between the inner and outer rings. The method comprises the steps of: providing a tube of a composite material, the composite material including a mix of a base polymer, reinforcing fibers and lubricant; machining the outer surface of the tube to a desired outside diameter of the separator and the inner surface of the tube to a desired inside diameter of a central pocket; and cutting the tube to provide at least one annular body having a desired axial length of the separator.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
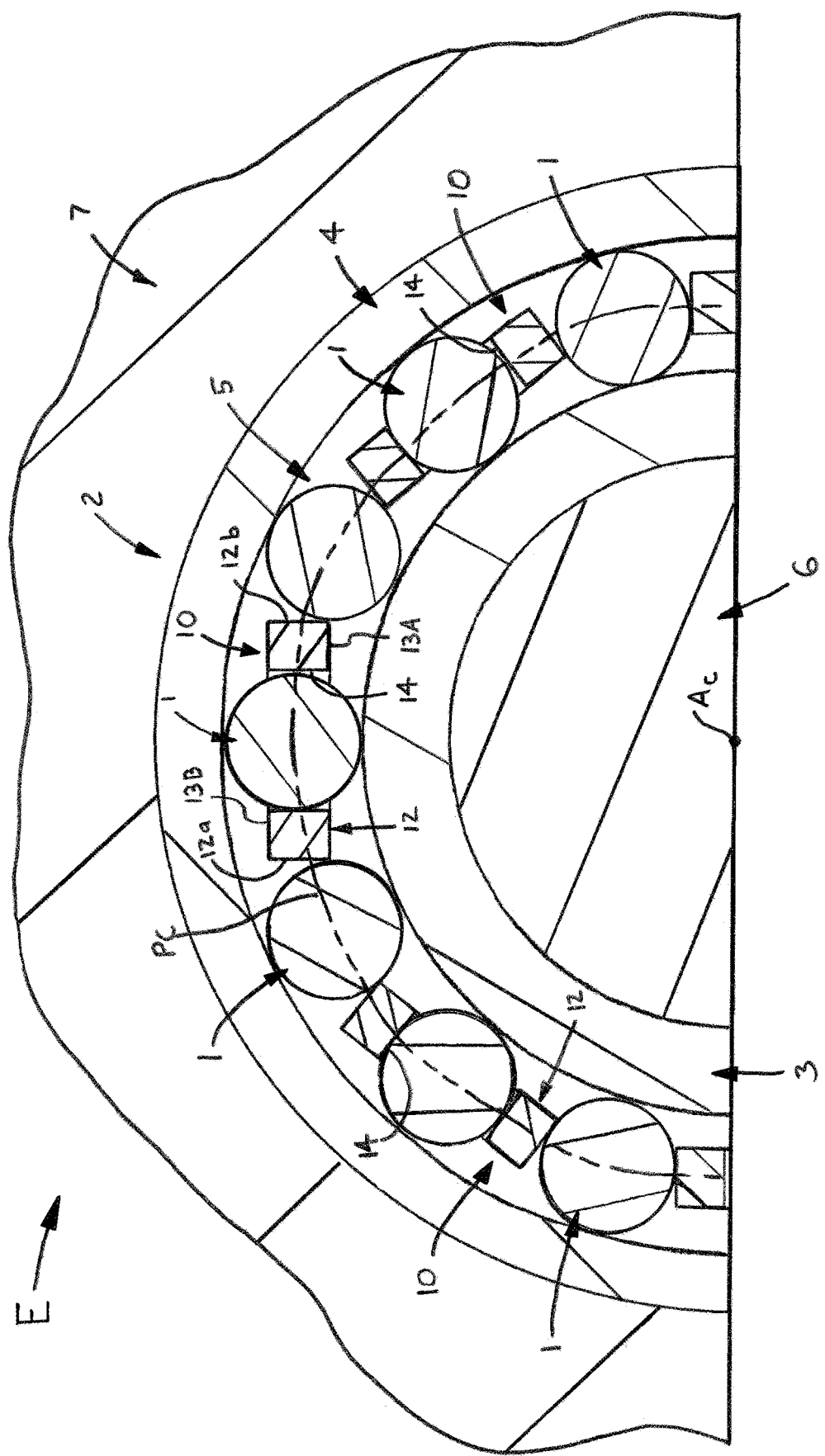
FIG. 1 is a radial cross-sectional view through a bearing including a plurality of separators of the present invention, the bearing coupling a shaft with an outer member of a machine.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. The terminology includes the words specifically mentioned above, derivatives thereof, and words of similar import.

Referring now to the drawings in detail, wherein like numbers are used to indicate like elements throughout, there is shown in FIGS. 1-12 a separator 10 for rolling elements 1 of a bearing 2, the bearing 2 including an inner ring 3, an outer ring 4 and a plurality of the rolling elements 1 disposed between the inner and outer rings 3, 4 and forming a ballset 5. The bearing 2 functions to rotatably couple an inner member 6, such as a shaft, with an outer member 7, for example a housing or hub, so that one member 6 or 7 rotates about a central axis $A_C$ as the rolling elements 1 traverse a pitch circle PC (FIG. 1) defined between the rings 3, 4. Preferably, the inner and outer members 6, 7 are components or structural members of a machine or item of equipment E used in a sterile environment, such as semiconductor manufacturing, food processing, etc., but may be used in any other appropriate application.

Figure 5:
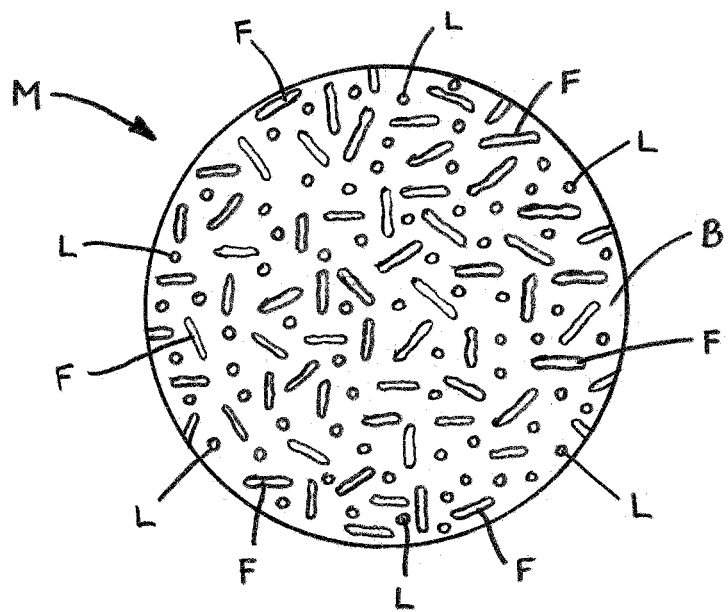
FIG. 5 is a detail view of a section of FIG. 4 indicated by arrow 5.

Basically, the separator 10 comprises a body 12 formed of a composite material M and having a central pocket 14 sized to receive one of the plurality of rolling elements 1, a centerline extending through the pocket 14, a first contact end 12a, an opposing, second contact end 12b, a first surface 13A, and a second, opposing surface 13B, the pocket 14 extending between the first and second surfaces 13A, 13B. As shown in FIG. 5, the composite material M includes a mixture of a polymer base B, reinforcing fibers F and a lubricant L, as described in detail below. Further, the bearing 2 preferably includes a plurality of the separators 10, each separator 10 being disposed about every other rolling element 1 of the ballset 5, as depicted in FIG. 1.

Specifically, the ballset 5 of the bearing 2 has a number N (e.g. twenty) of the rolling elements 1 disposed between the inner and outer rings 3, 4 and spaced circumferentially about the central axis $A_C$ so as to define the pitch circle PC. Preferably, the bearing 2 has a number X of the separators 10, the number X being equal to one half the value of N. For example, when the ballset 5 includes twenty rolling elements 1, the bearing 2 includes ten separators 10. Further, the number X of separators 10 are disposed about every other rolling element 1 around the pitch circle PC and contacts two adjacent rolling elements 1 of the ballset 5. Further, the rolling elements 1 are preferably balls as depicted, but may alternatively be cylindrical rollers, needles or any other appropriate rolling element depending on the particular application.

Figure 2:
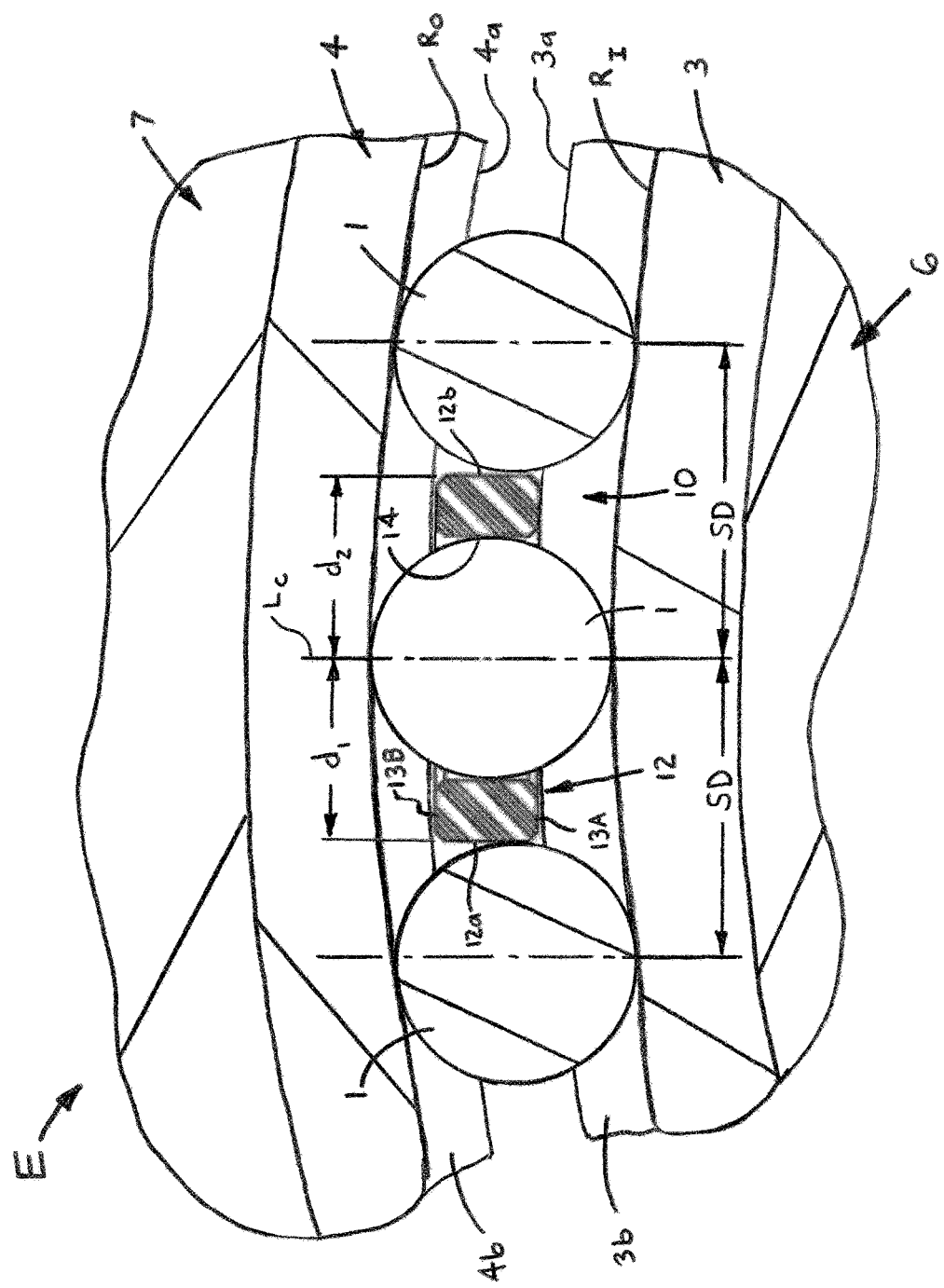
FIG. 2 is an enlarged view of a portion of FIG. 1.

Referring to FIGS. 1, 2 and 6-8, the first contact end 12a of each separator 10 is configured to contact an adjacent one of the rolling elements 1 and the second contact end 12b is configured to contact another adjacent one of the rolling elements 1. As indicated in FIG. 2, the separator body 12 is sized such that a first distance $d_1$ between the centerline $L_C$ and the first contact end 12a establishes a desired spacing distance SD between the one rolling element 1 disposed within the pocket 14 and the adjacent one of the rolling elements 1, and a second distance $d_2$ between the centerline $L_C$ and the second contact end 14b establishes a desired spacing distance SD between the one rolling element 1 and the another adjacent one of the rolling elements 1. Further, the first surface 13A preferably functions as an inner retention surface and is configured to be slidably disposed upon at least one inner guide surface 3a of the bearing inner ring 3 and/or the second surface 13B functions as an outer retention surface and is configured to be slidably disposed against at least one outer guide surface 4a of the bearing outer ring 4. In a typical application in which the axial ends of the bearing rings 3, 4 lie within vertical planes, the first retention surface 13A slides against the outer guide surface 3a of the inner ring 3 when a separator 10 is located within upper quadrants of the bearing 2 and the second retention surface 13B slides against the inner guide surface 4a of the outer ring 4 when the separator 10 is disposed within lower quadrants of the bearing 2.

By supporting either and preferably both of the inner and outer retention surfaces 13A, 13B, the separator 10 is maintained located centrally about the particular rolling element 1 disposed within the pocket 14 as the rolling element 1 traverses the pitch circle PC. Preferably, the at least one guide surface 3a is provided by at least one and preferably two shoulders 3b of the inner ring 3, each providing one of two guide surfaces 3a, located adjacent to a bearing inner raceway $R_I$. Similarly, the at least one guide surface 4a is provided by at least one and preferably two shoulders 4b (only one shown) of the outer ring 4 located adjacent to a bearing outer raceway $R_O$. However, either or both of the guide surfaces 3a, 4a may be provided by another portion of the inner or outer bearing rings 3, 4, such as for example, a single circumferentially extending guide projection (not shown) of the inner ring 3 spaced axially from the inner raceway $R_I$ and/or a single guide projection (not shown) of the outer ring 4 spaced axially from the outer raceway $R_O$.

Figure 3:
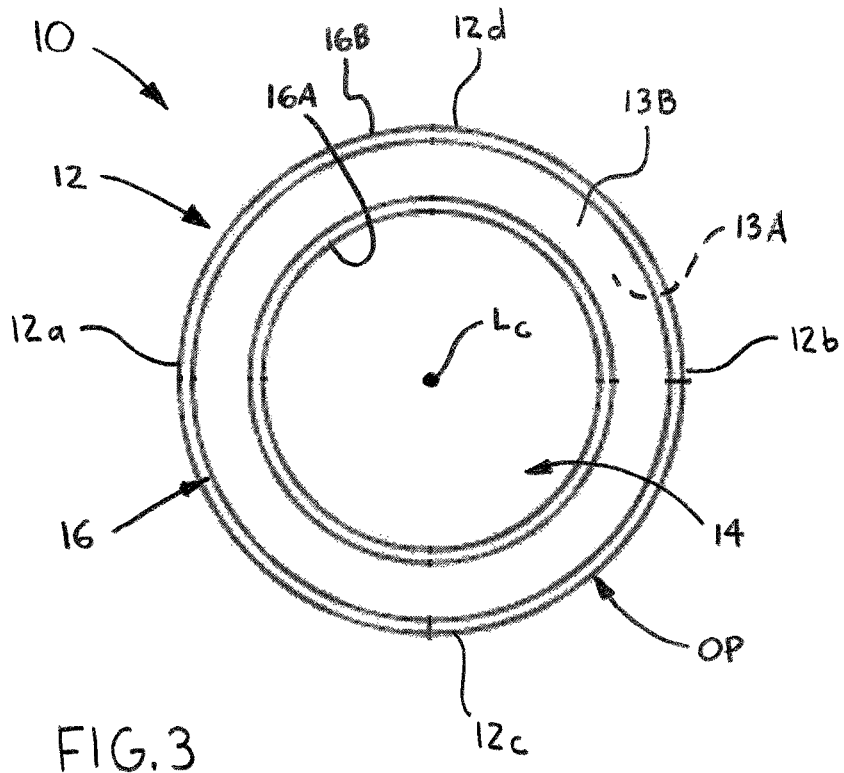
FIG. 3 is a top plan view of a separator formed in accordance with a first construction of the present invention.
Figure 4:
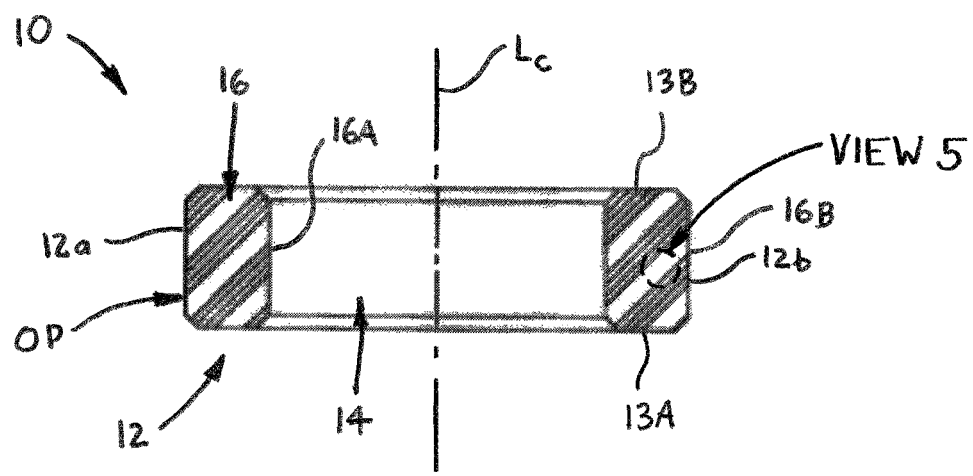
FIG. 4 is a cross-sectional view through the separator of FIG. 3.
Figure 6:
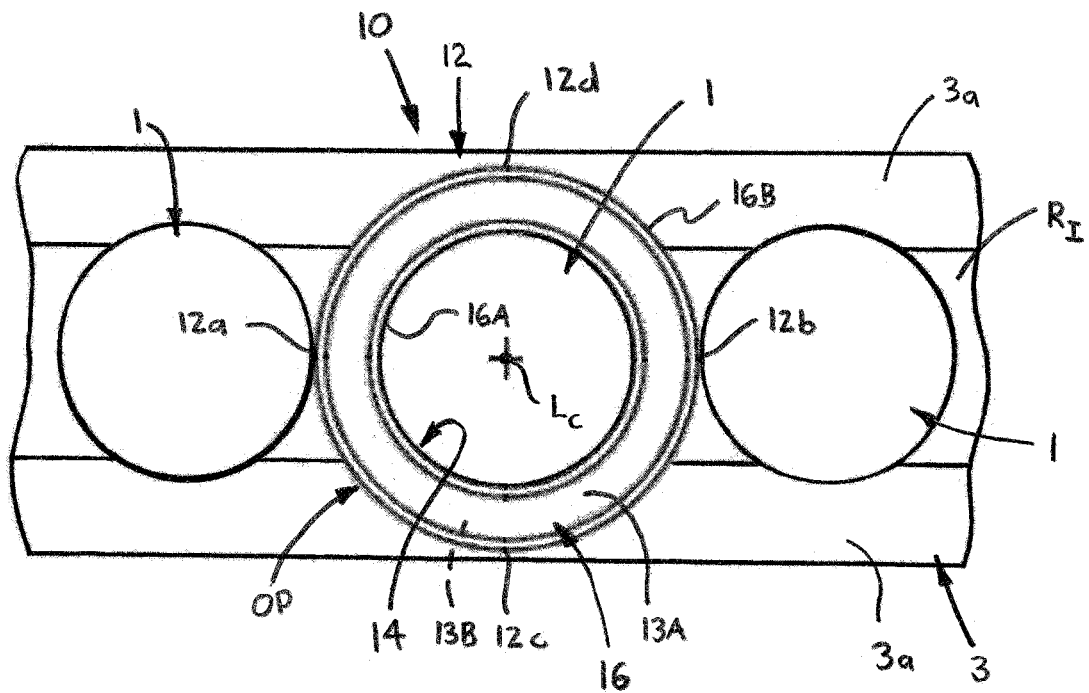
FIG. 6 is a broken-away, side plan view of a bearing inner ring and rolling elements installed on the inner ring, showing a first construction separator installed on a rolling element.

Further, the separator body 12 has an outer perimeter OP providing the first and second contact ends 12a. 12b and two opposing sides 12c. 12d each extending between the contact ends 12a, 12b, the outer perimeter OP preferably being circular, rectangular or complex-shaped. More specifically, in a first preferred construction, the separator body 12 is a circular cylinder 16 including an inner circumferential surface 16A defining the pocket 14 and an outer circumferential surface 16B providing the first and second contact ends 12a, 12b and the sides 12c, 12d, as shown in FIGS. 3, 4 and 6. With such a construction, the ends 12a, 12b and the sides 12c, 12d are interchangeable or variable due to the body 12 being generally free to rotate or turn about the centerline $L_C$. That is, with the circular outer perimeter OP, the body 12 may angularly displace about the centerline $L_C$ during circulation of the rolling elements 1 such that a section of the outer perimeter OP providing a contact end 12a or 12b at one position on the pitch circle PC may be located so as to provide a side end 12c or 12d at another position on the pitch circle PC.

Figure 7:
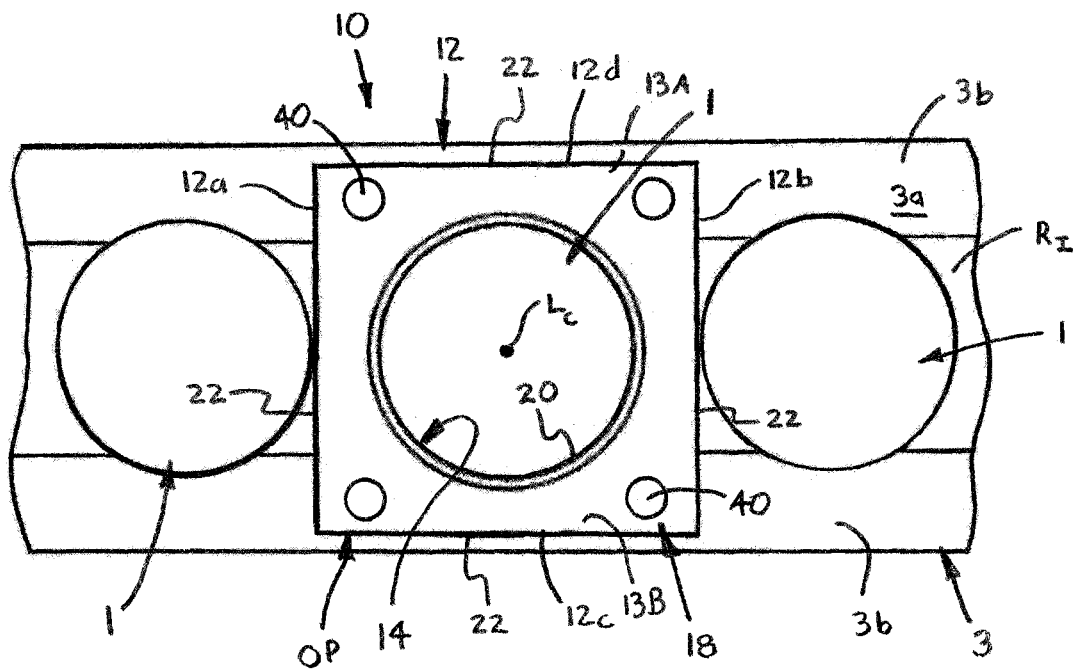
FIG. 7 is another broken-away, side plan view of a bearing inner ring and rolling elements installed on the inner ring, showing a second construction of the separator installed on a rolling element.
Figure 8:
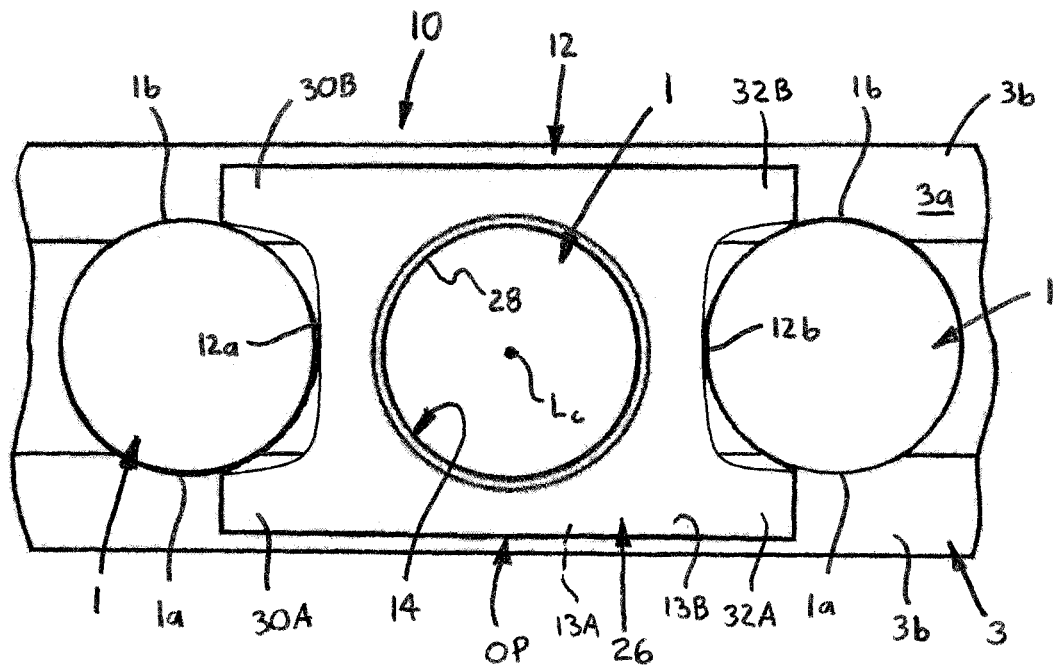
FIG. 8 is yet another broken-away, side plan view of a bearing inner ring and rolling elements installed on the inner ring, showing a third construction of the separator installed on a rolling element.

In a second preferred construction shown in FIG. 7, the separator body 12 is a rectangular block 18 having an enclosed inner circumferential surface 20 defining the pocket 14 and four outer flat surfaces 22 providing the contact ends 12a, 12b and the sides 12c, 12d. In a third preferred construction depicted in FIG. 8, the separator body 12 is a complex-shaped block 26 including an enclosed inner circumferential surface 28 defining the pocket 14, a first pair of contact arms 30A, 30B extending outwardly from the first contact end 12a and a second pair of contact arms 32A, 32B extending outwardly from the second contact end 12b. Each arm 30A, 30B is configured to be disposed against a separate axial end 1a, 1b of the one adjacent rolling element 1 and each arm 32A, 32B is configured to be disposed against a separate axial end 1a, 1b of the another adjacent rolling element 1. As such, the two pairs of arms 30A, 30B and 32A, 32B are configured to prevent rotation of the separator body 12 about the centerline $L_C$.

Figure 9:
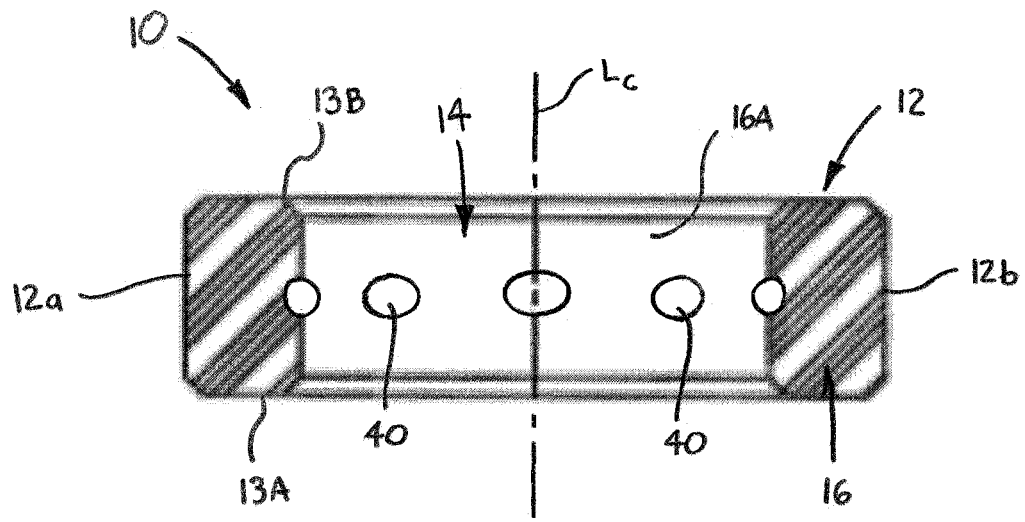
FIG. 9 is an enlarged cross-sectional view of the separator of FIG. 3, shown with a plurality of lubricant cavities on an inner surface.
Figure 10:
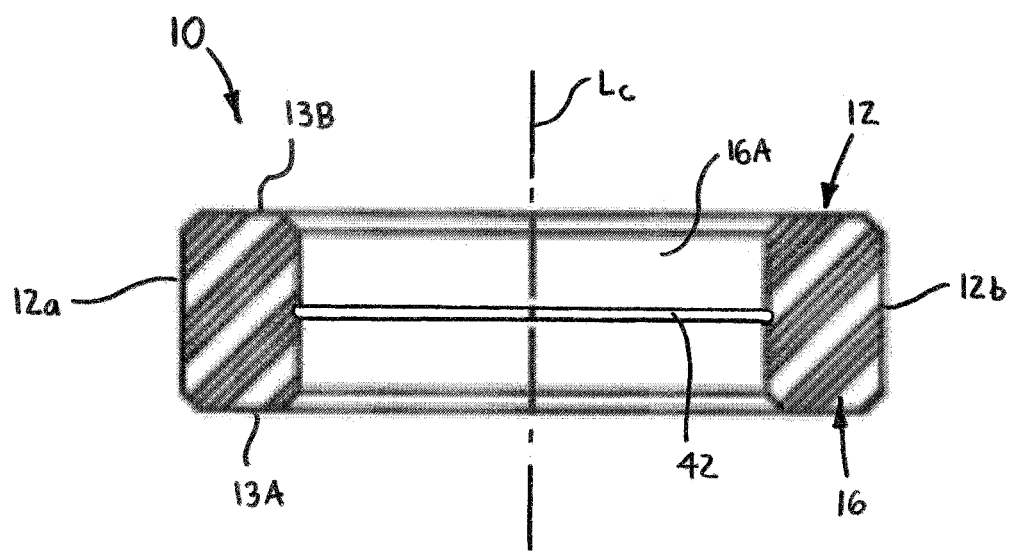
FIG. 10 is another enlarged cross-sectional view of the separator of FIG. 3, shown with a lubricant groove on an inner surface.

Referring to FIGS. 9 and 10, in any of the separator body constructions, the separator 10 preferably has at least one and preferably a plurality of cavities 40 and/or at least one groove 42 formed in the inner circumferential surface 16A, 20 or 28 of the separator body 12. The cavities 40 and/or the grooves 42 may also be formed in one or both of the retention surfaces 13A, 13B, as depicted in FIG. 7 for the separator second construction. Each cavity 40 and/or each groove 42 is configured to contain a quantity of lubricant so as to reduce friction between the rolling element 1 and the pocket 14, and portion of this lubricant may be transferred by the rolling elements 1 to the raceways $R_I$, $R_O$ of the inner and/or outer rings 3, 4 to reduce friction therebetween. Preferably, the lubricant disposed within the cavities 40 or grooves 42 is a lubricant adapted for use in a vacuum environment, such as for example, a multiply alkylated cyclopentane ("MAC") based grease thickened with PTFE (e.g., NyeTorr® 6200) or a PTFE thickened perfluoropolyether grease (e.g., NyeTorr® 6300). However, the lubricant contained within the cavities 40 and/or grooves 42 may be any other appropriate lubricant suitable for the particular application of the bearing 2.

Referring to FIG. 5, the composite material M includes a mixture of a polymer base B, reinforcing fibers F and a lubricant L. Preferably, the amount of the reinforcing fibers F in the composite material M is between ten percent by weight (10%) and thirty percent (30%) by weight and an amount of the lubricant L in the composite material M is between one-half percent (0.5%) by weight and ten percent (10%) by weight. Most preferably, the amount of the reinforcing fibers F is about thirty percent (30%) by weight and the amount of the lubricant L is about five percent (5%) by weight. However, the composite material M may alternatively include any other desired amount of reinforcing fibers F and/or lubricant L as suitable for a particular application.

Preferably, the reinforcing fibers F include short strand carbon fibers, the lubricant L includes molybdenum disulfide ($MoS_2$) and the polymer base B includes polyetherimide (hereinafter "PEI"). Most preferably, the desired composite material M is formed having a polymer base of polyetherimide, short strand carbon fibers in an amount of about thirty percent (30%) by weight and molybdenum sulfide in an amount of five percent (5%) by weight.

Alternatively, the reinforcing fibers F may include glass strands, glass spheres, Kevlar or any other appropriate reinforcing materials. The lubricant L within the composite material M may alternatively include graphite, polytetrafluorethylene ("PTFE") or another appropriate lubricant material capable of mixing with a polymer base material. Further, the polymer base B may include another appropriate polymer material, for example, ultrahigh molecular weight polyethylene ("UHMWPE").

Due to the use of polyetherimide, the separator 10 is configured to operate at a temperature of up to two hundred degrees Celsius (200° C.), making the separator 10 particularly suitable for high temperature applications. Specifically, the separator 10 is configured to function or operate without softening of the composite material M, such that the separator 10 remains dimensionally stable and does not bind with the rolling elements 1 or with the inner and outer rings 3, 4.

With the preferred structure of the composite material M, the separator 10 has a stiffness of about six thousand seven hundred megapascals (6700 MPA), a glass transition temperature about two hundred twenty degrees Celsius (220° C.), a maximum working temperature of about two hundred degrees Celsius (200° C.), a percent total mass loss due to outgassing in a vacuum of about 0.58 and a coefficient of friction ($\mu$) against the rolling elements 1 of between about 0.35 and 0.4. In comparison, a separator formed of PEEK has a stiffness of about seven thousand megapascals (7000 MPA), a glass transition temperature about one hundred thirty-five degrees Celsius (135° C.), a maximum working temperature of about one hundred twenty degrees (120° C.), a percent total mass loss due to outgassing in a vacuum of about 0.2 and a coefficient of friction ($\mu$) against the rolling elements 1 of about 0.3. Thus, a separator 10 formed of a base polymer B of PEI has a much higher working temperature and similar stiffness compared to a PEEK cage, although slightly greater friction and less dimensional stability. However, the present separator 10 has a significantly lower manufacturing cost in comparison with a PEEK cage, as discussed further below.

Figure 11:
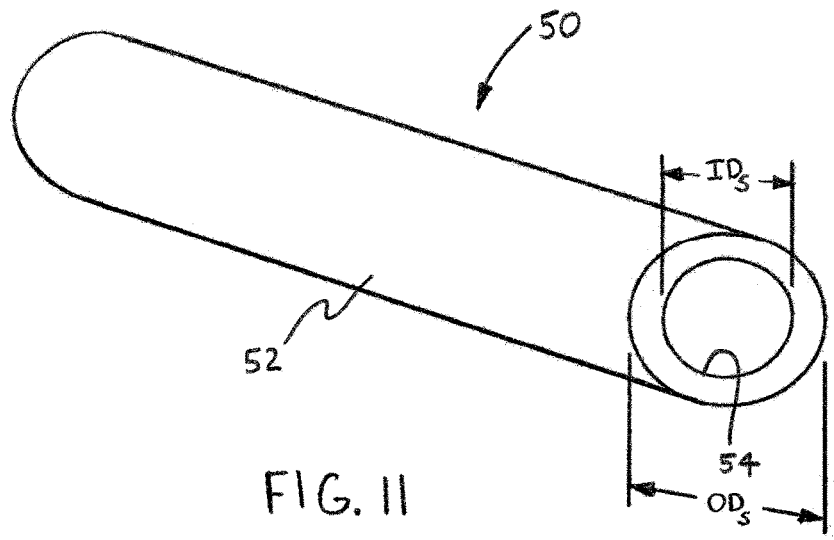
FIG. 11 is a perspective view of a tube of composite material used to fabricate a plurality of separators of the first construction.
Figure 12:
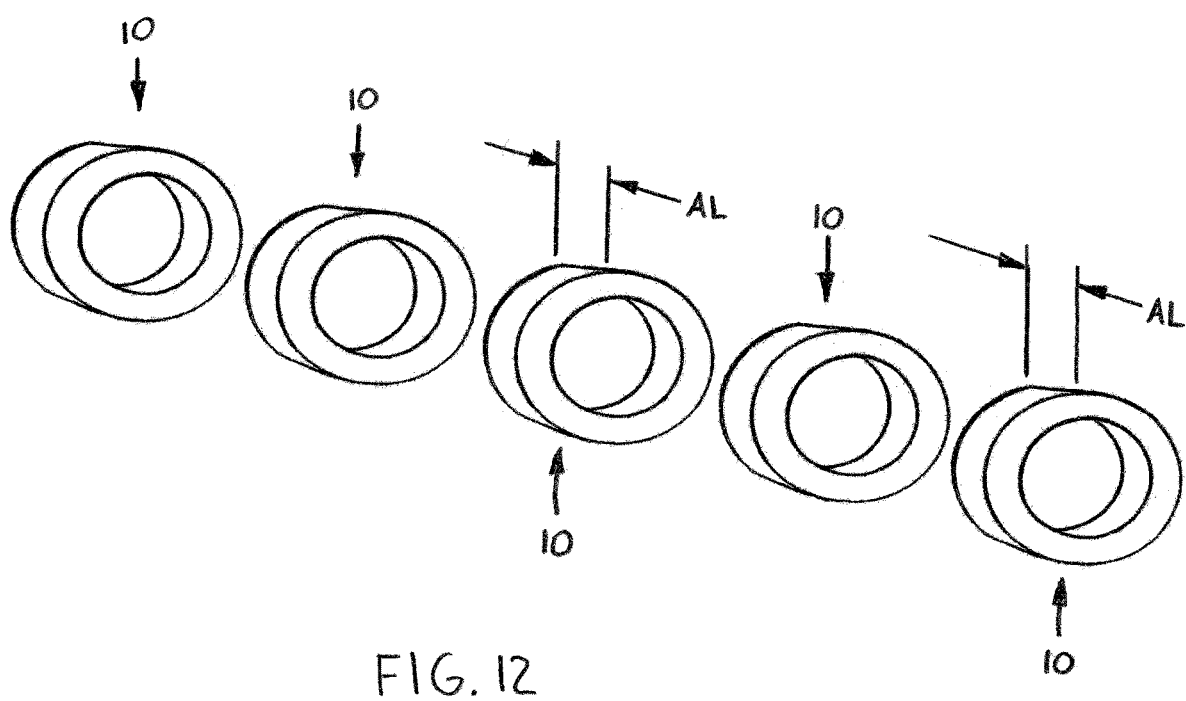
FIG. 12 is a plurality of separators formed from the tube depicted in FIG. 11.

Referring now to FIGS. 11-12, the present bearing cage 10 is preferably formed in accordance with one of the two following fabrication methods. When the separator 10 has a circular perimeter OP as shown in FIGS. 3, 4 and 6, the separator 10 may be formed by a first preferred method, as follows. First, a tube 50 formed of the desired composite material M, i.e., having a specific polymer base B, desired percentage and type of the reinforcing fibers F and a desired percentage and type of the lubricant L is provided. Next, an outer surface 52 of the tube 50 is machined to a desired outside diameter $OD_S$ of the separator and an inner surface 54 of the tube 50 is machined to a desired inside diameter $ID_S$ of the pocket 14. Then, the tube 50 is cut to provide at least one and preferably a plurality of separator bodies 12 having a desired thickness AL of the separator 10, which corresponds to the distance between the first and second surfaces 13A, 13B. Finally, if cavities 40 or grooves 42 are desired for retaining lubricant, these cavities 40 and/or grooves 42 are machined in at least the inner surface 16A of the pocket 14.

Alternatively, and preferably when the separator body 12 has an outer perimeter OP that is rectangular or complex-shaped, the separator 10 may be formed in an injection molding process using an appropriately machined injection mold. In such a process, at least one and preferably a plurality of separator bodies 12 are fabricated in the mold, then each is finish machined to remove any flashing, runners or other extraneous material. If any desired cavities 40 or grooves 42 are not formed in the injection mold, they may be provided by a subsequent machining operation. However, the rectangular or complex-shaped separator bodies 12 may alternatively be formed by machining from a solid block of composite material M, or any of the various constructions of the separator 10 described herein may be produced by any other appropriate manufacturing process.

In any case, due to the composition of the composite material M, the present separator 10 has a substantially reduced manufacturing cost in comparison with a similar device formed of PEEK. Specifically, the cost to manufacture each separator 10 from the composite material M including polyetherimide as the polymer base B is about fifty percent (50%) of the cost to manufacture a similar separator from PEEK, in other words, a fifty percent (50%) reduction in cost.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

I claim:

1. A separator for a rolling element of a bearing, the bearing including inner and outer rings and a plurality of rolling elements disposed between the inner and outer rings, the separator comprising:
   a body formed of a composite material and having a central pocket sized to receive one of the plurality of rolling elements, a first contact end configured to contact an adjacent one of the rolling elements and an opposing, second contact end configured to contact another adjacent one of the rolling elements, the composite material including a mixture of a polymer base, reinforcing fibers and a lubricant;
   wherein an amount of the reinforcing fibers in the composite material is between ten percent by weight and thirty percent by weight and an amount of the lubricant in the composite material is between one-half percent by weight and ten percent by weight.

2. The separator as recited in claim 1, wherein the separator body has a centerline extending centrally through the pocket and the body is sized such that a first distance between the centerline and the first contact end establishes a desired spacing distance between the one rolling element disposed within the pocket and the adjacent one of the rolling elements and a second distance between the centerline and the second contact end establishes a desired spacing distance between the one rolling element disposed within the pocket and the another adjacent one of the rolling elements.

3. The separator as recited in claim 1, wherein the separator body has a first surface and an opposing, second surface, the pocket extending between the first and second surfaces, the first surface being configured to be slidably disposed upon an outer circumferential surface of the bearing inner ring and/or the second surface being configured to be slidably disposed against an inner circumferential surface of the bearing outer ring so as to retain the separator disposed centrally about the rolling element disposed within the pocket.

4. The separator as recited in claim 1, wherein the separator body has an outer perimeter providing the first and second contact ends, the outer perimeter being circular, rectangular or complex-shaped.

5. The separator as recited in claim 1, wherein the separator body is a circular cylinder and includes an inner circumferential surface defining the pocket and an outer circumferential surface providing the first and second contact ends.

6. The separator as recited in claim 1, wherein the separator body has a centerline extending centrally through the pocket, is complex-shaped and includes at least one of:
   a first pair of contact arms extending outwardly from the first contact end, each arm of the first pair of arms being configured to be disposed against a separate axial end of the one adjacent rolling element such that the first pair of arms are configured to prevent rotation of the separator body about the centerline; and
   a second pair of contact arms extending outwardly from the second contact end, each arm of the second pair of arms being configured to be disposed against a separate one of two opposing axial sides of the other adjacent rolling element such that the second pair of arms are configured to prevent rotation of the separator body about the centerline.

7. The separator as recited in claim 1, wherein an amount of the reinforcing fibers in the composite material is about thirty percent by weight and an amount of the lubricant in the composite material is about five percent by weight.

8. The separator as recited in claim 7, wherein the reinforcing fibers include short strand carbon fibers, the lubricant includes molybdenum disulfide and the polymer base includes polyetherimide.

9. The separator as recited in claim 1, wherein at least one of:
   the reinforcing fibers include short strand carbon fibers; and
   the lubricant includes molybdenum disulfide.

10. The separator as recited in claim 1, wherein the polymer base includes polyetherimide.

11. The separator as recited in claim 10, wherein the separator is configured to operate at a temperature of up to two hundred degrees Celsius without softening of the composite material.

12. The separator as recited in claim 1, wherein the pocket is defined by an inner circumferential surface of the separator body and the separator has at least one cavity and/or at least one groove formed in the inner circumferential surface of the separator body, each cavity and/or groove being configured to contain a lubricant.

13. The separator as recited in claim 1, wherein the annular body is formed from a tube formed of the composite material which has an outer surface machined to a desired outside diameter, an inner surface machined to a desired inside diameter and then cut to a desire axial length.

14. A method of forming a separator for a bearing having an inner ring, an outer ring and a plurality of rolling elements disposed between the inner and outer rings, the method comprising the steps of:
   providing a tube of a composite material, the composite material including a mix of a base polymer, reinforcing fibers and lubricant;
   machining the outer surface of the tube to a desired outside diameter of the separator and the inner surface of the tube to a desired inside diameter of a central pocket; and
   cutting the tube to provide at least one annular body having a desired thickness of the separator.

15. The method as recited in claim 14, further comprising the step of machining at least one cavity and/or at least one groove in the inner surface of the pocket.

16. The method as recited in claim 14, wherein:
   an amount of the reinforcing fibers in the composite material is between ten percent by weight and thirty percent by weight; and
   an amount of the lubricant in the composite material is between one-half percent by weight and ten percent by weight.

17. The method as recited in claim 16, wherein at least one of:
   the reinforcing fibers include short strand carbon fibers and the lubricant includes molybdenum disulfide; and
   the polymer base includes polyetherimide.

18. A bearing assembly comprising:
   an inner ring having a centerline;
   an outer ring disposed about the inner ring;
   a number N of rolling elements disposed between the inner and outer rings and spaced circumferentially about the centerline so as to define a pitch circle; and
   a number X of separators, the number X being equal to one half a value of N, each separator including a body formed of a composite material and having a central pocket sized to receive one of the number N of rolling elements and the number X of separators being disposed about every other rolling element around the pitch circle, each separator body having a first contact end configured to contact an adjacent one of the rolling elements and an opposing, second contact end configured to contact another adjacent one of the rolling elements, the composite material including a mixture of a polymer base, reinforcing fibers and a lubricant;

wherein the polymer base includes polyetherimide, the reinforcing fibers include short strand carbon fibers in an amount of between ten percent by weight and thirty percent by weight, and the lubricant includes molybdenum disulfide in an amount of between one-half percent by weight and ten percent by weight.

19. A separator for a rolling element of a bearing, the bearing including inner and outer rings and a plurality of rolling elements disposed between the inner and outer rings, the separator comprising:

a body formed of a composite material and having a central pocket sized to receive one of the plurality of rolling elements, a first contact end configured to contact an adjacent one of the rolling elements and an opposing, second contact end configured to contact another adjacent one of the rolling elements, the composite material including a mixture of a polymer base, reinforcing fibers and a lubricant;

wherein the pocket is defined by an inner circumferential surface of the separator body and the separator has at least one cavity and/or at least one groove formed in the inner circumferential surface of the separator body, each cavity and/or groove being configured to contain a lubricant.

* * * * *